I. C. CRANE.
Harvester Rake.
No. 42,752.  Patented May 17, 1864.
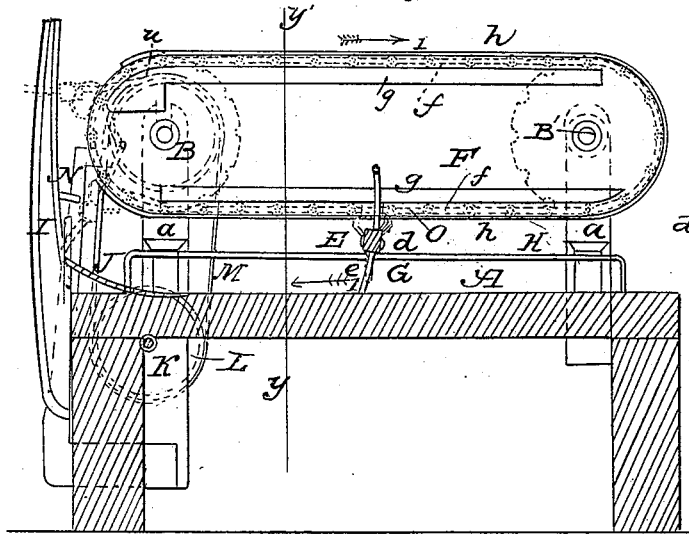
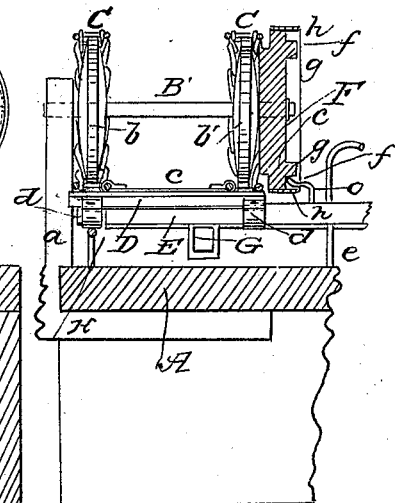
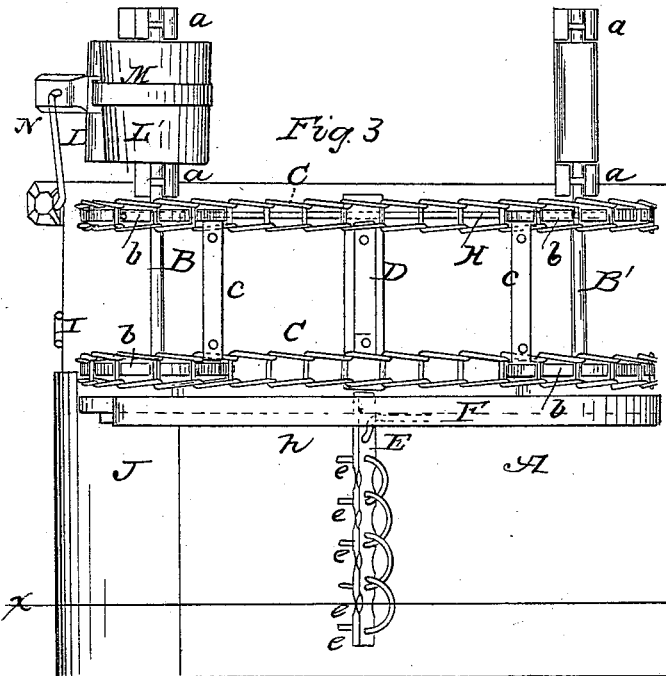

UNITED STATES PATENT OFFICE.

ISAAC C. CRANE, OF EDGERTON, OHIO.

IMPROVEMENT IN RAKING ATTACHMENTS TO HARVESTERS.

Specification forming part of Letters Patent No. 42,752, dated May 17, 1864.

*To all whom it may concern:*

Be it known that I, ISAAC C. CRANE, of Edgerton, in the county of Williams and State of Ohio, have invented a new and Improved Raking Device for Harvesters; and I do hereby declare that the following is a full, clear, and exact description of the same, reference being had to the accompanying drawings, making a part of this specification, in which—

Figure 1 is a front view of my invention, the platform of the harvester to which the invention is applied being in section, as indicated by the line $x\,x$, Fig. 2; Fig. 2, a plan or top view of the same; Fig. 3, a transverse vertical section of the same, taken in the line $y\,y$, Fig. 1.

Similar letters of reference indicate corresponding parts in the several figures.

This invention relates to a new and improved raking device for harvesters of that class in which a rake is attached to an endless belt or chain.

The object of the invention is to obtain a raking device of the class specified which will discharge the cut grain from the platform in a perfect manner and from either the side or rear of the platform, according to the position in which the working parts are placed, the parts being so arranged as to cause the rake while performing its work to present itself properly to the cut grain while passing over the platform and to discharge the grain properly therefrom, the speed of the rake also being rendered capable of being varied and modified as occasion may require.

To enable those skilled in the art to fully understand and construct my invention, I will proceed to describe it.

A represents the platform of a harvester, and B B' two shafts the bearings of which are in uprights $a$ at the rear of the platform and near each side of the same. These shafts project over the platform A a certain distance, and have each two pulleys, $b\,b$, on them, the peripheries of which are notched or toothed to receive the ends of the links of endless chains C C, which work over said pulleys and prevent the chains from slipping on the pulleys, as will be fully understood by referring to Fig. 2. The chains C C may be connected by a suitable number of cross-bars, $c$, and they have a cross-bar, D, attached to them, to which bearings $d\,d$ are secured, the latter having a rake-head, E, fitted in them in such a manner that it may turn or rotate. The rake-head E projects over the platform A toward its front end, and is provided with rake-teeth $e$, constructed in any proper manner.

On the front ends of the shafts B B' there is fitted a horizontal upright board, F, the front side of which has a groove, $f$, at its upper and lower edge, as shown in Figs. 1 and 3. These grooves $f$ may be formed by attaching horizontal cleats $g$ to the front side of the board F, and by nailing sheet-metal plates $h$ to the upper and lower edges of said board. The grooves $f$ do not extend around the ends of the board, but the plates $h$ do at the inner end of F, as will be seen by referring to Fig. 1. The rake-head E at a point between the two chains C C has an arm, G, projecting from it, the use of which will be presently explained, and to the platform A, directly underneath the rear chain C, there is attached a horizontal rod, H, which serves as a bearing for the back end of the rake-head when the latter is passing along at the under sides of the pulleys $b\,b$.

To the discharge end of the platform A there is attached an upright, I, which is in line with the arm G on the rake-head E, and there is also attached to said end of the platform a concave plate, J, which is in line with the rake-teeth and over which the cut grain is discharged from the platform.

K represents a driving-shaft, which is below the shaft B, and which has a cone-pulley, L, upon it, a similar pulley, L', being on the shaft B, but having a reverse position to L.

M is a strap or belt, which passes around the pulleys L L'; and N is a belt-shipper for adjusting M on the cone-pulleys.

O is an arm attached to the rake-head, and which works in the grooves $f\,f$ of the board F.

The operation is as follows: As the machine is drawn along power is communicated to the shaft K from the traction-wheels or any working part or parts connected therewith, and motion is communicated from the shaft K to the chains C C through the medium of the cone-pulleys L L' and belt M. The chains C C and rake-head E move in the direction indicated by the arrow 1, the rake-teeth being turned upward free from the platform as the rake passes along above the pulleys $b\,b$, the rake-teeth being turned down so as to sweep over the platform as the rake-head passes around the end of the board F, in consequence of the arm O working against the plates $h$. The arm and grooves serve as a guide for the rake and keep it in proper position while passing over the platform. The rake-teeth sweep the cut grain from the platform while passing over the latter, and as the rake-teeth pass up the concave plate J and the rake-head E passes around the end of the board F above the concave plate, the arm O is released from or moves out of the lower groove, $f$, and the arm G will come in contact with the upright I, and the rake-teeth will, in consequence of the contact of said parts, be turned in a vertical or nearly vertical position, so as to discharge the cut grain freely from the platform, and when the arm G passes the upright I the rake-teeth are turned upward and pass along in an elevated position above the pulleys $b$ $b$, the arm O passing into the upper groove, $f$, of the board F.

I design to have the rake-teeth extend through the rake-head E, so as to project from both sides of it in order to relieve the teeth of unnecessary strain while performing their work. The resistance which the cut grain offers to the rake-teeth above the head will counteract the resistance offered to them below it. The horizontal rod H serves as a bearing for the rear end of the rake-head E, and prevents the rake, while performing its work, being forced upward from the platform under the resistance or action of the grain. In consequence of having the rake-head E fitted in bearings $d$ $d$, attached to a bar, D, which is secured to the chains C, a firm connection of the rake with said chains is obtained.

The speed of the chains C and rake may be varied or modified, as desired, by adjusting the belt M on the cone-pulleys L L' through the medium of the belt-shipper N.

I do not claim broadly a rake for harvesters attached to one or more endless chains, for that is an old device; but I do claim as new and desire to secure by Letters Patent—

1. The endless chains C C, in combination with the board F, provided with grooves $ff$, and rake-head E, provided with the arm O, all arranged to operate substantially as and for purpose herein set forth.

2. The arm G, attached to the rake-head E, in combination with the upright I, attached to the platform A, substantially as and for the purpose specified.

3. The rod H, when used in combination with the rake-head E, attached to the endless chains C C, for the purpose described.

4. The cone-pulleys L L', belt M, belt-shipper N, in combination with the endless chains C C, rake-head E, and board F, provided with grooves $ff$, all constructed and arranged in the manner and for the purpose herein set forth.

ISAAC C. CRANE.

Witnesses:
NORMAN RELYEA,
EUGENE D. THOMAS.